UNITED STATES PATENT OFFICE.

DAVID ALTER AND EDWARD GILLESPIE, OF FREEPORT, PENNSYLVANIA.

IMPROVEMENT IN THE MANUFACTURE OF BROMINE.

Specification forming part of Letters Patent No. 5,658, dated July 5, 1848.

*To all whom it may concern:*

Be it known that we, DAVID ALTER and EDWARD GILLESPIE, of Freeport, in the county of Armstrong and State of Pennsylvania, have invented a new and Improved Mode of Manufacturing Bromine; and we do hereby declare that the following is a full and exact description.

The nature of our invention consists in the use of earthen retorts made with an admixture of pulverized coke-boiling bittern for heating the retorts and a mixture of clay and bittern for luting.

To enable others skilled in the art to make and use our invention, we will proceed to describe its construction and operation.

We construct a fire-place and flue, on which is placed a metallic boiler or pan wide enough to admit two rows of retorts, and of sufficient length to receive all the retorts intended to be used, its depth to correspond with the height of retorts. The retorts are made of good earthenware clay, with the addition of pulverized coke, and are in the form of a jug or cylinder, having handles or ears on each side (if ears, iron hooks are required to handle the retort) and knobs on bottom. The retorts of cylindrical form have two holes in the top—one for the insertion of glass connecting-tube, the other for inserting materials. The connecting-tube is bent to a little more than a right angle three or four inches from end, of sufficient length to reach from hole in the retort as it stands in the pan to the condensing-tube. The condensing-tube is of glass or lead, its bore large enough to admit the end of the connecting-tubes. It is bent near the middle, passed through a wooden vessel containing cold water, enters perpendicularly a receiver made of glass, containing a few inches of water, the lower end of condensing-tube being under the surface of the water in the receiver.

The pan is nearly filled with bittern of saltwater, made to boil, the retorts nearly filled with three parts boiling and one part cold bittern. Sulphuric acid, diluted with about twelve times its bulk of water, is added and well mixed with the bittern in the retort. The retort is then placed in the pan. The bent end of the connecting-tube is luted into one of the holes in the retort. The other end enters the condensing-tube and the junction also luted. Black oxide of manganese is then added to the contents of the retort at the other aperture and it luted.

The quantity of acid used is regulated by the quanity of bromine contained in the bittern, eight or nine fluid ounces of acid being required to make five or six ounces, by weight, of bromine; the quantity of manganese about two-thirds the weight of acid.

The luting is made of pipe-clay mixed to the proper consistence with bittern. The bittern in the pan is kept boiling until the bromine in the retort is all run off, the retort then lifted out of the pan, and its contents emptied, refilled, &c.

What we claim as our invention, and desire to secure by Letters Patent, is—

The application of the kind of retorts specified, the use of the bittern as a means of applying a proper heat to the retorts, and the clay and bittern luting in the manufacture of bromine.

DAVID ALTER.
ED. GILLESPIE.

Witnesses:
J. A. GILLESPIE,
J. D. TORBETT.